(12) United States Patent
Farnsworth et al.

(10) Patent No.: US 7,290,999 B2
(45) Date of Patent: *Nov. 6, 2007

(54) EXTRUSION DIE PLATE AND CUTTER ASSEMBLY WITH HYDRAULIC MOTOR

(75) Inventors: John T. Farnsworth, St. Joseph, MO (US); Jack K. Boatman, St. Joseph, MO (US)

(73) Assignee: Nestec S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/314,295

(22) Filed: Dec. 21, 2005

(65) Prior Publication Data

US 2006/0153942 A1    Jul. 13, 2006

Related U.S. Application Data

(63) Continuation of application No. 10/030,567, filed on Mar. 21, 2002, now Pat. No. 7,037,095.

(51) Int. Cl.
*B29F 3/04* (2006.01)
*B29F 3/08* (2006.01)

(52) U.S. Cl. .................. 425/190; 425/67; 425/313; 425/196; 425/382 R; 82/11.5; 137/565.9

(58) Field of Classification Search .............. 425/190, 425/67, 71, 196, 311, 313, 315, 316, 382 R, 425/464, DIG. 230, 308, 310; 82/11.5; 137/565.19, 137/585.19; 83/435.17, 435.22, 437.3, 402, 83/591, 612

See application file for complete search history.

(56) References Cited

U.S. PATENT DOCUMENTS

| | | | | | |
|---|---|---|---|---|---|
| 2,764,952 | A | * | 10/1956 | Meakin | ............ 425/196 |
| 4,123,207 | A | * | 10/1978 | Dudley | ............ 425/67 |
| 4,564,350 | A | * | 1/1986 | Holmes et al. | ....... 425/313 |
| 5,110,523 | A | * | 5/1992 | Guggiari | ......... 264/40.5 |
| 5,525,052 | A | * | 6/1996 | Czarnetzki et al. | ... 425/183 |
| 5,641,529 | A | | 6/1997 | Kunas | |
| 7,037,095 | B1 | * | 5/2006 | Farnsworth et al. | ... 425/67 |

FOREIGN PATENT DOCUMENTS

| | | |
|---|---|---|
| DE | 4036196 | 11/2006 |
| GB | 1139212 | 1/1969 |
| JP | 05169442 | 7/1993 |
| JP | 08216150 | 8/1996 |

\* cited by examiner

*Primary Examiner*—Yogendra N. Gupta
*Assistant Examiner*—Dimple N. Bodawala
(74) *Attorney, Agent, or Firm*—Bell, Boyd & Lloyd LLP

(57) ABSTRACT

A die plate for an extruder is coupled directly to a fluid-driven motor on one side and to an extruder on the other side. Suitable fluid inlet and outlet passages are formed in the die plate to supply the motor with fluid and withdraw fluid. A cutter assembly includes a housing to receive the motor within and is coupled for rotation to an output shaft from the motor, so that in use blades mounted on the housing are caused to rotate into the path of extrudate and to sever it.

11 Claims, 4 Drawing Sheets

EXTRUSION DIE PLATE AND CUTTER ASSEMBLY WITH HYDRAULIC MOTOR

CROSS-REFERENCE TO RELATED APPLICATIONS

This application is a Continuation of U.S. patent application Ser. No. 10/030,567 filed on Mar. 21, 2002, now U.S Pat. No. 7,037,095.

FIELD OF THE INVENTION

This invention relates to e ion apparatus which includes a die plate through which extrudate is received and shaped, the extrudate being severed into discrete pieces as it emerges from the die plate by a cutter assembly having a blade that is rotated into the path of movement of the extrudate.

BACKGROUND OF THE INVENTION

Cutter assemblies for cutting extrudate have in the past been associated with electrically-driven motors. Such a cutter assembly will rotate about a fixed shaft mounted to the extruder and the coupling to a motor for rotation may be via a spool attached to a belt driven by the motor, as in U.S. Pat. No. 5,641,529, or via a universal drive connection that is itself coupled to another drive. Such assemblies are cumbersome because of the space occupied by the electric motor, the associated coupling means, and the framework necessary to support the motor unit.

U.S. Pat. No. 5,525,052 describes an extrusion machine enabling the changing of extrusion dies without incurring production down time, by providing at least two dies on a support plate that is rotatable on an axis parallel with respect to the extruder axis. An hydraulic motor may be used to power a cutter that is arranged to sever extrudate leaving the extruder through the die. There is no mention of the arrangement for supplying drive fluid to and removing it from the motor. A drive shaft connects the motor to a satellite mitre gear that is coupled to provide drive to the cutter.

An object of this invention is to provide means for rotating a cutter blade that may be integrated into the cutter assembly to thereby save space and facilitate maintenance of the extrusion apparatus.

SUMMARY OF THE INVENTION

In accordance with a first aspect of this invention, a die plate for an extruder is modified to be coupled directly to a fluid-driven motor on one side and to an extruder on the other side. Suitable fluid inlet and outlet passages are formed in the die plate to supply, the motor with motor-driving fluid and to withdraw fluid. The die plate thus has:

first coupling means for coupling the die plate on a first side thereof to an extruder defining a longitudinal axis, second coupling means for coupling the die plate on a second side thereof to a cutter assembly disposed on said longitudinal axis, apertures through which extrudate is received from the extruder and extruded for cutting into predetermined lengths by said cutter assembly, a fluid inlet passage for receiving motor-driving fluid into the die plate for delivery to said cutter assembly, and a fluid outlet passage for receiving fluid from said cutter assembly for discharge from the die plate, the cutter assembly having a fluid driven motor for rotating a cutter transversely to said longitudinal axis into the path of movement of extrudate so as to sever the extrudate In a preferred form of the invention, the die plate has a peripheral edge adjoining the first and second sides, the fluid inlet passage and fluid outlet passage each having a radial portion extending radially through said peripheral edge toward a central area of the die plate where each passage terminates in a respective longitudinal portion extending through said second side of the die plate.

The first and second coupling means preferably include a plurality of mounting openings for receiving respective fasteners through the die plate.

According to a second aspect of the invention, a die plate and cutter assembly includes a die plate having first coupling means for coupling the die plate on a first side thereof to an extruder, defining a longitudinal axis, second coupling means for coupling the die plate on a second side thereof to a cutter assembly disposed on said longitudinal axis, apertures through which extrudate is received from the extruder and extruded for cutting into predetermined lengths by said cutter assembly, a fluid inlet passage for receiving fluid into the die plate for delivery to said cutter assembly, and a fluid outlet passage for receiving fluid from said cutter assembly for discharge from the die plate, the cutter assembly having a fluid-driven motor coupled to said second side of the die plate and adapted to receive motor-driving fluid from said fluid inlet passage in use and to discharge said fluid into said fluid outlet passage, and a rotatable cutter, driven for rotation transversely to said longitudinal axis by said motor, into the path of movement of extrudate so as to sever the extrudate.

The cutter assembly includes a housing which receives the motor within and is coupled for rotation to an output shaft from the motor.

In a preferred form of the invention, the rotatable cutter includes a housing coupled for rotation to said motor, the motor being receivable within said housing. The motor preferably includes an output shaft which may be coupled to the housing.

In a further preferred form of the invention, the housing includes blade mounting means for supporting at least one radially extending blade having a predetermined separation from said second side of the die plate and adapted to sever extrudate emerging therefrom in use.

The motor may be any fluid driven motor. A preferred embodiment is a hydraulic motor. An alternative preferred embodiment is a pneumatic motor.

The fluid inlet and outlet passages in the die plate may be thermally insulated from the extrudate outlet apertures. Insulation may be by means of a gap that may be filled with a gas. The gas may be air. The gap is preferably located around the fluid passages.

The invention extends in a further aspect to a cutter assembly for coupling to a die plate, and for cutting extrudate emerging therefrom, the assembly comprising positioning means for positioning the assembly close to an extrudate outlet, a housing, a fluid-driven motor receivable to be mountable in the housing, a cutting blade and mounting means for mounting the blade to the housing, so that, on actuation of the motor in use, the blade is caused to rotate into a path of movement of extrudate emerging from the said outlet, so as to sever it.

The positioning means may comprise coupling means for coupling the assembly to a die plate so that the blade is located to be a predetermined distance from the plate.

In a preferred form of the invention, the fluid-driven motor includes a fluid inlet directed toward the die plate for receiving driving fluid therefrom in use. The inlet is preferably directed to be located opposite a corresponding outlet in the die plate to which it is mountable.

BRIEF DESCRIPTION OF THE DRAWINGS

A preferred embodiment of the invention is described below with reference to the accompanying drawings, in which.

DESCRIPTION OF PREFERRED EMBODIMENT

Figure 1:
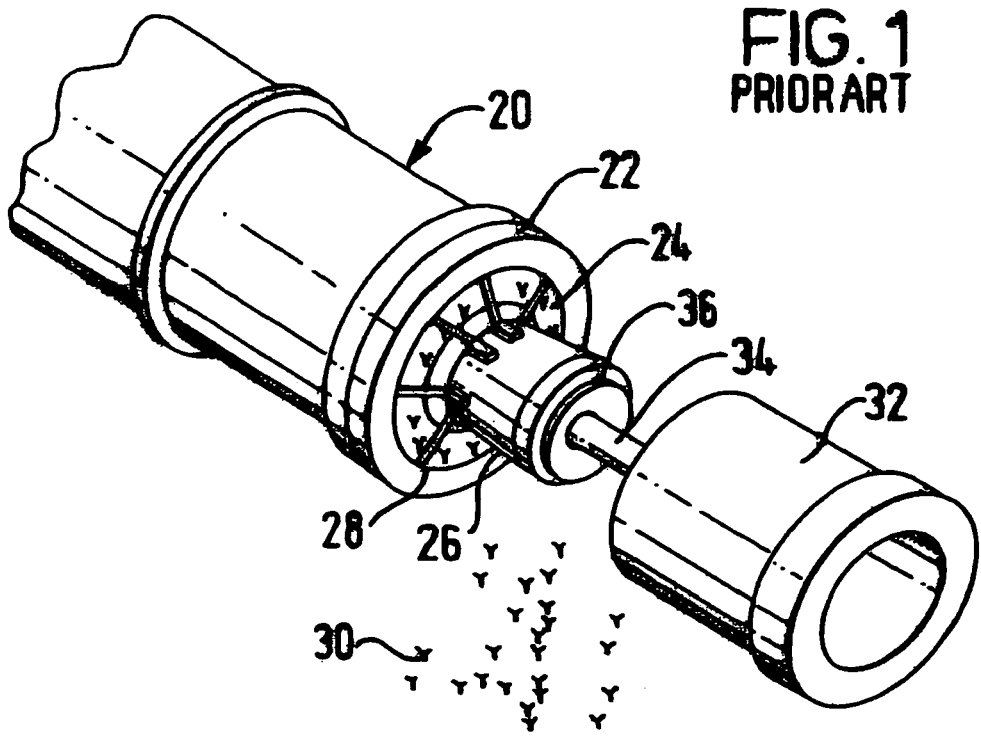
FIG. 1 is a schematic perspective view showing an extruder coupled to an electrically-driven motor.

An extruder generally indicated by reference numeral 20 in FIG. 1 comprises a longitudinally extending housing which is coupled at one end to a die plate 22. The die plate 22 has a plurality of die openings 24 through which extrudate is received during operation of the extruder 20. A cutter assembly 26 is rotatably mounted to a shaft (not shown) and includes a plurality of radially-extending blades 28 which, when rotated, sever the extrudate into discrete pieces 30. An electrically-driven motor 32 with axially-extending driveshaft 34 is coupled to the cutter assembly 26 via a universal drive connection 36 mounted to one end of the cutter assembly 26 remote from the extruder 20. It will be understood that the motor 32 must be supported, for example, with an associated framework, in order to operate the cutter assembly without becoming unbalanced.

Figure 2:
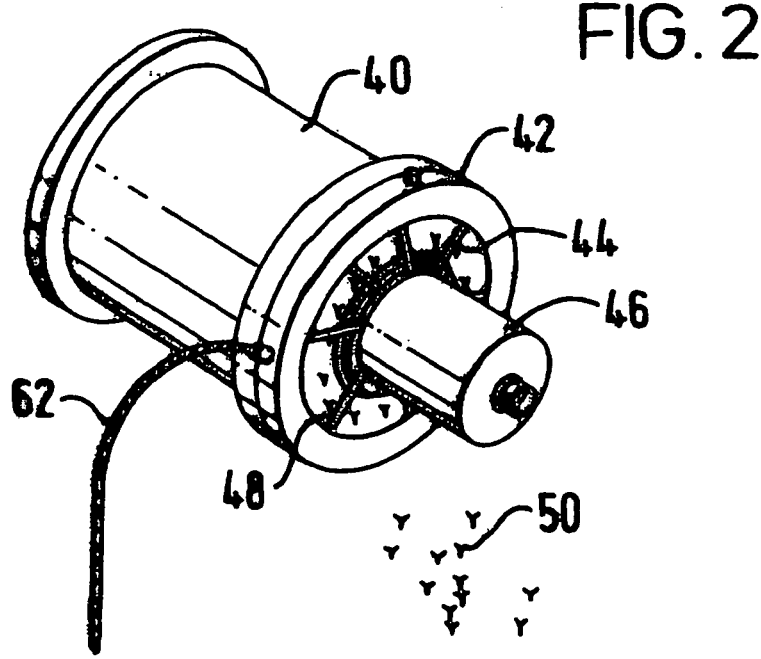
FIG. 2 is a similar view to FIG. 1 showing an extruder coupled to a hydraulic motor in accordance with the invention.

In accordance with the invention, the installation and operation of the extrusion apparatus is simplified considerably by integrating a fluid-driven motor into the cutter assembly. Non-limiting embodiments will now be described with reference to the remaining drawings. In FIG. 2 of the drawings, there is shown a conventional extruder 40 which includes a longitudinally-extending housing and is coupled at one end to a die plate 42 made in accordance with the invention. The die plate 42 has a plurality of die apertures 44 for receiving extrudate from the extruder 40, in accordance with normal practice. A cutter assembly 46 is associated with the die plate 42 and includes a plurality of radially-extending blades 48 for cutting the extrudate into discrete pieces 50.

Figure 3:
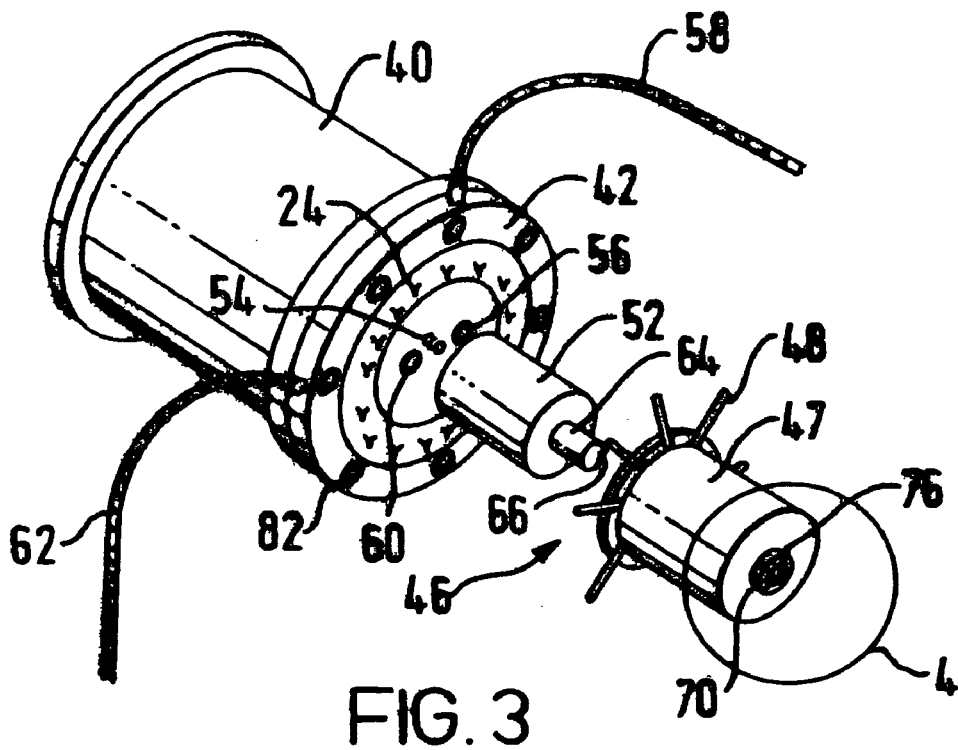
FIG. 3 is an exploded perspective view showing a housing for the cutter assembly of FIG. 2 spaced from the hydraulic motor.
Figure 4:
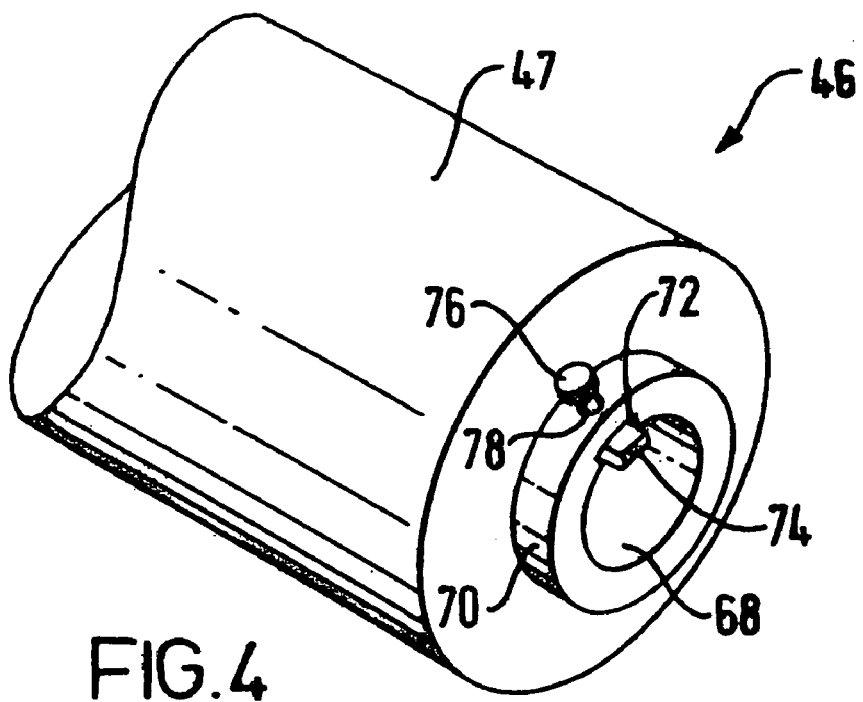
FIG. 4 is an enlarged view of circled area 4 in FIG. 3.

As can be seen more dearly from FIG. 3, the cutter assembly 46 includes a cylindrical housing 47 which houses a hydraulically-driven motor 5Z The motor 52 is centrally mounted to the die plate 42 with mounting bolts 54 (only one of which is shown in FIG. 3). Alternatively, the motor 52 could be located eccentrically with respect to the die plate 42. A hydraulic fluid inlet passage 56 in fluid communication with a hydraulic fluid supply hose 58 is formed in the die plate 42 and is in fluid communication with the hydraulic motor 52. A hydraulic outlet passage 60 is also formed in the die plate 42 and is in fluid communication with a hydraulic fluid outlet hose 62 so as to withdraw hydraulic fluid from the hydraulic motor 52.

The hydraulic motor 52 has an output shaft 64 which extends longitudinally from the extruder 40 and has a longitudinally-extending key way 66. The output shaft 64 is received through an opening 68 formed in a boss 70 which extends longitudinally from the housing 47 for the cutter assembly 46 at one end opposite from the extruder 40. A second key way 72 is formed in the opening 68 and slidably receives a key 74. The key 74 is located between key ways 66, 72 and set screw 76 received through an aperture 78 formed in the boss 70 bears upon the key 74 to prevent longitudinal displacement of the key. This arrangement secures the cutter assembly 46 to the output shaft 64 of the hydraulic motor 52 so that, upon actuation of the motor, the blades 48 will rotate to sever the extrudate. It will be understood that there is a pre-determined separation between the cutter blades 48 and the outer surface of the die plate 42.

Figure 7:
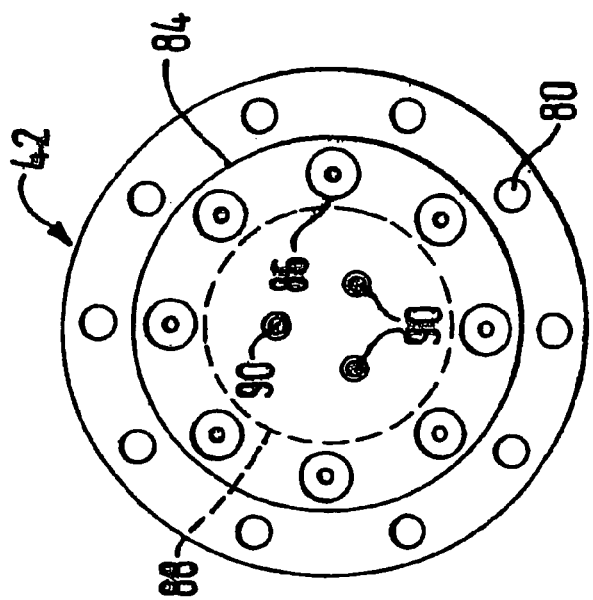
FIG. 7 is a back plan view of the die plate of FIG. 5.
Figure 6:
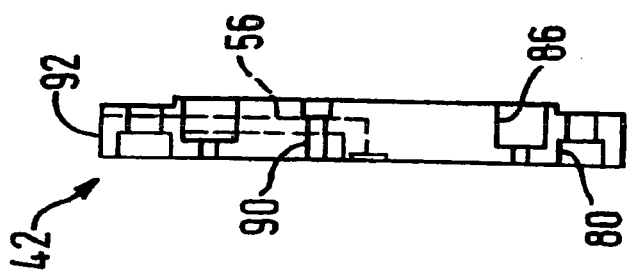
FIG. 6 is a side elevation view of the die plate of FIG. 5.
Figure 5:
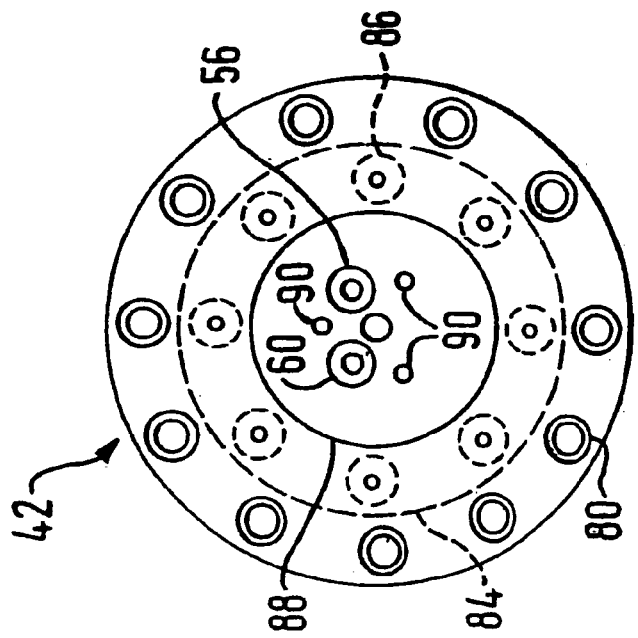
FIG. 5 is a front plan view of a die plate comprising the invention.

The die plate 42 is shown in more detail in FIGS. 5 through 7. As will be common in the art, the die plate 42 has coupling means for coupling the die plate on an inner side thereof to the extruder 40 and these comprise a series of counter-sunk openings 80 equally spaced around the periphery of the die plate 42 through which mounting bolts 82 (FIG. 3) are received and threaded into cooperating threaded openings (not shown) provided on the extruder 40.

The die plate 42 includes an inner ring 84 which has a series of equally-spaced openings 86 which define respective die nozzles through which extrudate is received and extruded In a central area 88 of the die plate 42, three counter-sunk openings 90 are formed to receive the mounting bolts 54 that secure the die plate 42 to the hydraulic motor 52 (FIG. 3). It will be noted that counter-sunk openings 80 and 90 are oppositely directed in order to allow the die plate to be coupled to the extruder 40 and to the hydraulic motor 52 on respective sides thereof.

Both the hydraulic inlet passage 56 and hydraulic outlet passage 60 (only one of which is shown in ghost outline in the side elevation view of FIG. 6) comprise a radial portion which extends radially from a peripheral edge 92 of the die plate 42 towards the central area 88 where the passages terminate in respective longitudinally-extending portions that terminate on the front side of the die plate 42 so as to communicate with respective passages provided in the hydraulic motor 52. O-ring seals (not shown) are seatable in the openings defining the hydraulic inlet passage and outlet passage 56, 60.

By integrating the hydraulic motor into the cutter assembly, the extruder installation is considerably simplified with attendant advantages in minimizing space required for installation and ease of maintenance.

Figure 8:
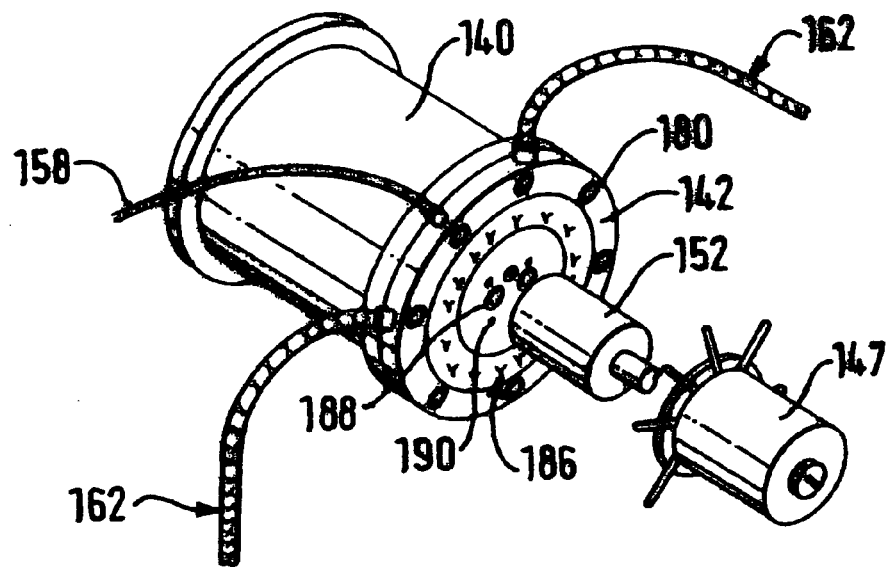
FIG. 8 is similar to FIG. 2, showing an extruder coupled to a pneumatic motor in accordance with the invention.
Figure 9:
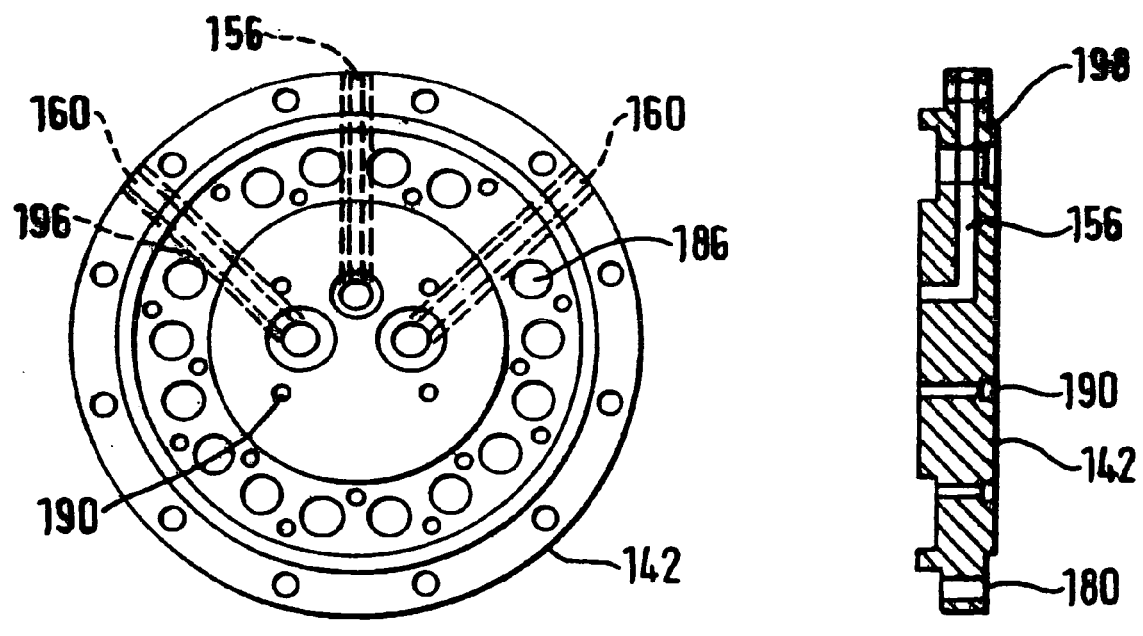
FIG. 9 is a back plan view of die plate comprising the invention.

Referring to FIGS. 8 and 9, there is illustrated a further embodiment of the invention, in which the die plate 142, connected to extruder 140, is adapted to receive a pneumatically-driven motor 152. Here, as previously described with regard to the aforegoing embodiment, bolt holes 180 and 190 enable secural of the die plate 142 to the extruder 140 and motor 152 respectively. The motor 152 is housed in cylindrical housing 147, shown withdrawn to expose the said motor. Tubes 158 and 162 feed and withdraw air from the die plate 142 and are connectable to a compressed air supply system (not shown).

Compressed air tubes 158 and 162 connect with internal channels 156 and 160 within the body of the die plate 142. Surrounding each of the channels 156 and 160 is an insulating gap 196, to provide thermal insulation between the tube and the die plate material and extrudate passing through the die. The gap is filled with air, but it will be appreciated that many other gases would be suitable as substitutes.

As in the case of the equivalent liquid delivering tube described above in respect of the hydraulic counterpart the air delivering passages extend radially to the central region of the die plate 142 and then change direction to be axially directed for coupling to the corresponding fluid ports on the pneumatic motor in central region 188 of the die plate. The die plate includes nozzle formations 186 for extrudate release and a mechanical seal 198 for facilitating fluid-tight coupling to the extruder.

It will be appreciated that several further variations may be made to the above-described preferred embodiment of the invention within the scope of the appended claims. In particular, it will be noted that, while hydraulic and pneumatic motors have been described, any fluid-driven motor may be accommodated into the above-described arrangement. It will also be appreciated that the key way coupling of the output shaft from the hydraulic motor to the cutter assembly may be modified, as required, as will be appreciated by anyone skilled in this art.

Finally, it will also be immediately apparent that the manner of mounting the cutter blades to the cutter assembly may be modified, as required, to suit the intended application and that a single cutting plate may be substituted for a plurality of cutting blades.

The invention claimed is:

1. A die plate for an extrusion apparatus, the die plate comprising:
   first coupling means for coupling the die plate on a first side thereof to an extruder defining a longitudinal axis, and
   apertures, through which extrudate is received from the extruder and extruded for cutting into predetermined lengths by a cutter assembly disposable on said longitudinal axis, the cutter assembly having a fluid driven motor for rotating a cutter transversely to said longitudinal axis into the path of movement of extrudate so as to sever the extrudate in use,
   the die plate having
   second coupling means for coupling the die plate on a second side thereof to said fluid driven motor, the fluid driven motor being mounted directly to the die plate,
   a fluid inlet passage for receiving fluid into the die plate for delivery to said cutter assembly in use, and
   a fluid outlet passage for receiving fluid from said cutter assembly for discharge from the die plate, wherein the fluid outlet passage and the fluid inlet passage comprise separate passages.

2. A die plate according to claim 1 having a peripheral edge adjoining said first and second sides, the fluid inlet passage and fluid outlet passage each having a radial portion extending radially through said peripheral edge toward a central area of the die plate where each passage terminates in a respective longitudinal portion extending through said second side of the die plate.

3. A die plate according to claim 1 wherein said first and second coupling means comprise a plurality of mounting openings for receiving respective fasteners through the die plate.

4. A die plate according to claim 1 including thermal insulation means between the fluid inlet and outlet passages and the extrudate apertures.

5. A die plate according to claim 4 wherein the thermal insulation means comprise a gap into which a gas may enter.

6. A cutter assembly for cutting extrudate comprising positioning means for positioning the cutter assembly close to an extrudate outlet, a housing, a fluid-driven motor receivable to be mountable in the housing, a cutting blade that, on actuation of the motor in use, is caused to rotate into a path of movement of extrudate emerging from the said extrudate outlet, so as to sever it, and including mounting means for mounting the blade to the housing, wherein the housing rotates with the blade upon actuation of the motor.

7. A cutter assembly according to claim 6 wherein the positioning means comprises coupling means for coupling the assembly to a die plate so that the blade is located to be a predetermined distance from the plate.

8. A cutter assembly according to claim 7 in which the motor includes a fluid inlet in fluid communication with a fluid supply hose that is in fluid communication with a fluid inlet passage formed in the die plate to receive driving fluid therefrom.

9. A die plate for use in an extrusion apparatus, the die plate comprising:
   a first coupling member for coupling the die plate on a first side thereof to an extruder defining a longitudinal axis,
   apertures, through which extrudate is received from the extruder and extruded for cutting into predetermined lengths by a cutter assembly disposable on said longitudinal axis that rotates a cutter transversely to the longitudinal axis so as to sever the extrudate, the cutter assembly comprising a motor,
   a second coupling member for coupling the die plate on a second side thereof to said motor, the motor being mounted directly to the die plate,
   a fluid inlet passage for receiving fluid into the die plate for delivery to said cutter assembly in use, and
   a fluid outlet passage for receiving fluid from said cutter assembly for discharge from the die plate, wherein the fluid outlet passage and the fluid inlet passage comprise separate passages.

10. A die plate according to claim 9 wherein said first and second coupling means comprise a plurality of mounting openings for receiving respective fasteners through the die plate.

11. A cutter assembly for cutting extrudate comprising a positioning member for positioning the cutter assembly close to an extrudate outlet, a housing, a die plate including a fluid inlet passage for receiving fluid for delivery to said cutter assembly and a fluid outlet passage for receiving fluid from said cutter assembly for discharge from the die plate, wherein the fluid outlet passage and the fluid inlet passage comprise separate passages, a fluid-driven motor, a cutting blade that can be caused to rotate into a path of movement of extrudate emerging from the said extrudate outlet so as to sever it, a mounting member for mounting the blade to the housing and a means for mounting the fluid-driven motor to the die plate, wherein the housing rotates with the blade upon actuation of the motor.

* * * * *